US012737959B2

(12) United States Patent
Lemberg

(10) Patent No.: US 12,737,959 B2
(45) **Date of Patent: *Sep. 15, 2026**

(54) METHOD AND SYSTEM FOR CLIENT-DEVICE TRANSFORMATION OF STATIC IMAGE DELIVERED OVER DISTRIBUTED COMPUTER NETWORK

(71) Applicant: Google LLC, Mountain View, CA (US)

(72) Inventor: Joseph Lemberg, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/822,968

(22) Filed: Sep. 3, 2024

(65) Prior Publication Data

US 2024/0428496 A1 Dec. 26, 2024

Related U.S. Application Data

(63) Continuation of application No. 17/717,693, filed on Apr. 11, 2022, now Pat. No. 12,106,414, which is a continuation of application No. PCT/US2019/059122, filed on Oct. 31, 2019.

(51) Int. Cl.
*G06T 13/80* (2011.01)

(52) U.S. Cl.
CPC .................................... *G06T 13/80* (2013.01)

(58) Field of Classification Search
None
See application file for complete search history.

(56) References Cited

U.S. PATENT DOCUMENTS

| | | | | |
|---|---|---|---|---|
| 6,121,977 | A | 9/2000 | Arai et al. | |
| 2008/0250321 | A1* | 10/2008 | Lee | G11B 27/034 715/732 |
| 2010/0302251 | A1 | 12/2010 | Yoon et al. | |
| 2013/0113833 | A1 | 5/2013 | Larsson | |
| 2015/0130816 | A1 | 5/2015 | Vigneras et al. | |

(Continued)

FOREIGN PATENT DOCUMENTS

WO 03045045 A2 5/2003

OTHER PUBLICATIONS

Chinese Office Action and Search Report, Application No. 201980101876.6, dated Sep. 5, 2024, 17 pages, w/ translation.

(Continued)

*Primary Examiner* — Andrew G Yang
(74) *Attorney, Agent, or Firm* — Leason Ellis LLP

(57) ABSTRACT

A multimedia communication system for enabling an end user computing device to render a moving image on a display device. The system has an image render command generator that is arranged to provide an image rendering command that is executable by a web browser of the end user computing device to cause the end user computing device to render the moving image on a frame-by-frame basis from a still image in multimedia content by slicing the still image into a plurality of rows or columns of pixels and modifying a subset of the plurality of rows or columns of pixels between frames, and a multimedia content packager arranged to assemble a multimedia content package having the multimedia content, including the still image and the image rendering command.

20 Claims, 11 Drawing Sheets

(56) References Cited

U.S. PATENT DOCUMENTS

| | | | |
|---|---|---|---|
| 2015/0348223 | A1 | 12/2015 | Dorsey et al. |
| 2016/0284105 | A1 | 9/2016 | Dawood |
| 2017/0062009 | A1 | 3/2017 | Clifton et al. |
| 2018/0109479 | A1 | 4/2018 | Bahk |
| 2021/0365277 | A1 | 11/2021 | Sproch et al. |

OTHER PUBLICATIONS

International Preliminary Report on Patentability dated May 12, 2022, International application No. PCT/US2019/059122, 9 pages.
International Search Report and Written Opinion dated May 27, 2020, International application No. PCT/US2019/059122, 10 pages.
Indian First Examination Report dated Mar. 17, 2025, IN Application No. 202227024574, 19 pages.
Chinese Office Action and Search Report dated Sep. 5, 2024, Application No. 201980101876.6, 17 pages.
Notification Concerning Transmittal of International Preliminary Report on Patentability dated May 12, 2022, International application No. PCT/US2019/059122, 1 page. 2024.
International Preliminary Report on Patentability dated May 12, 2022, International application No. PCT/US2019/059122, 8 pages. 2024.

* cited by examiner 210
220
240
210
220
200
240

240
220
210
220
200
210
240

METHOD AND SYSTEM FOR CLIENT-DEVICE TRANSFORMATION OF STATIC IMAGE DELIVERED OVER DISTRIBUTED COMPUTER NETWORK

CROSS REFERENCES TO RELATED APPLICATIONS

This application is a continuation of U.S. patent application Ser. No. 17/717,693, filed Apr. 11, 2022, which is a continuation of PCT Application No. PCT/US19/59122, filed Oct. 31, 2019, both of which are hereby incorporated by reference as if set forth in their entirety herein.

FIELD OF THE DISCLOSURE

The present disclosure relates to a method, system, and computer program for processing a static image and rendering an animated image transformation on a computing device.

BACKGROUND OF THE DISCLOSURE

In a computer networked environment such as the Internet, content providers supply content items for display on end-user computing devices. These content items can include logos, images, text, video or audio content. The content items can be linked to webpages associated with the content providers. Frequently, these content items can include content that is displayable as animated images on end-user computing devices. However, transmission of animated images can require significant data usage that can consume valuable transmission channel capacity and slow operation of the receiving end-user computing device.

There exists an unfulfilled need for a technological solution that can facilitate animated image rendering on end-user computing devices, while significantly lowering transmission channel usage and computing device response times when compared to state of the art transmission systems and methods that transmit animated images to end-user computing devices.

SUMMARY OF THE DISCLOSURE

The instant disclosure provides a technological solution that meets the unfulfilled need. The technological solution can provide device-agnostic content to end-user computing devices, such that each computing device can receive a static image and render an animated image on a display device based on the static image.

According to an aspect of the disclosure, the technological solution includes a system for enabling an end user computing device to render a moving image on a display device. The system comprises an image render command generator arranged to provide an image rendering command that is executable by a web browser of the end user computing device to cause the end user computing device to render the moving image on a frame-by-frame basis from a still image in multimedia content by slicing the still image into a plurality of rows or columns of pixels and modifying a subset of the plurality of rows or columns of pixels between frames, and a multimedia content packager arranged to assemble a multimedia content package comprising the multimedia content, including the still image and the image rendering command.

The system can further comprise a transmitter arranged to send the multimedia content package over a communication link to the end user computing device.

Modifying the subset of the plurality of rows or columns of pixels can comprise shifting a position of at least one row or column of pixels with respect to at least one additional row or column of pixels in the frame.

The image rendering command can be arranged to, when executed by the web browser, cause the end user computing device to load the still image into a memory cache in the end user computing device.

The image rendering command can be arranged to, when executed by the web browser, cause the end user computing device to slice the still image into the plurality of rows or columns of pixels.

The plurality of rows or columns of pixels can comprise a plurality of rows of pixel data and/or a plurality of columns of pixel data.

Modifying the subset of the plurality of rows or columns of pixels can comprise transforming the subset of the plurality of rows or columns of pixels to shift, move, compress, or expand with respect to each other.

The image rendering command can be arranged to, when executed by the web browser, cause the end user computing device to generate a frame for the moving image based on the modified subset of the plurality of rows or columns of pixels.

The image rendering command can be arranged to, when executed by the web browser, cause the end user computing device to render and display a sequence of frames for the moving image on the end user computing device based on the modified subset of the plurality of rows or columns of pixels.

The image rendering command can be arranged to, when executed by the web browser, cause the end user computing device to render and display a plurality of frames for the moving image on a frame-by-frame basis of an article.

The image rendering command can include JavaScript that is embedded in an HTML document that, when executed by a JavaScript engine in the web browser renders a sequence of frames for the moving image from the still image.

According to a further aspect of the disclosure, the technological solution includes a computer-readable medium that contains computer executable instructions that, when executed by a hardware processor in a computing device, causes the processor to perform a method to transmit multimedia content having a still image to an end user computing device to render the still image as a moving image on a display device. The method can comprise providing an image rendering command that is executable by a web browser of the end user computing device to cause the end user computing device to render the moving image on a frame-by-frame basis from a still image in multimedia content by slicing the still image into a plurality of rows or columns of pixels and modifying a subset of the plurality of rows or columns of pixels between frames; and packaging the multimedia content, including the still image and the image rendering command, in a multimedia content package.

Additional features, advantages, and embodiments of the disclosure may be set forth or apparent from consideration of the specification, including the detailed description, claims and drawings. The summary of the disclosure and the following detailed description and drawings may provide examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain principles of the disclosure. No attempt is made to show structural details of the disclosure in more detail than may be necessary for a fundamental understanding of the disclosure and the various ways in which it can be practiced.

Figure 1:
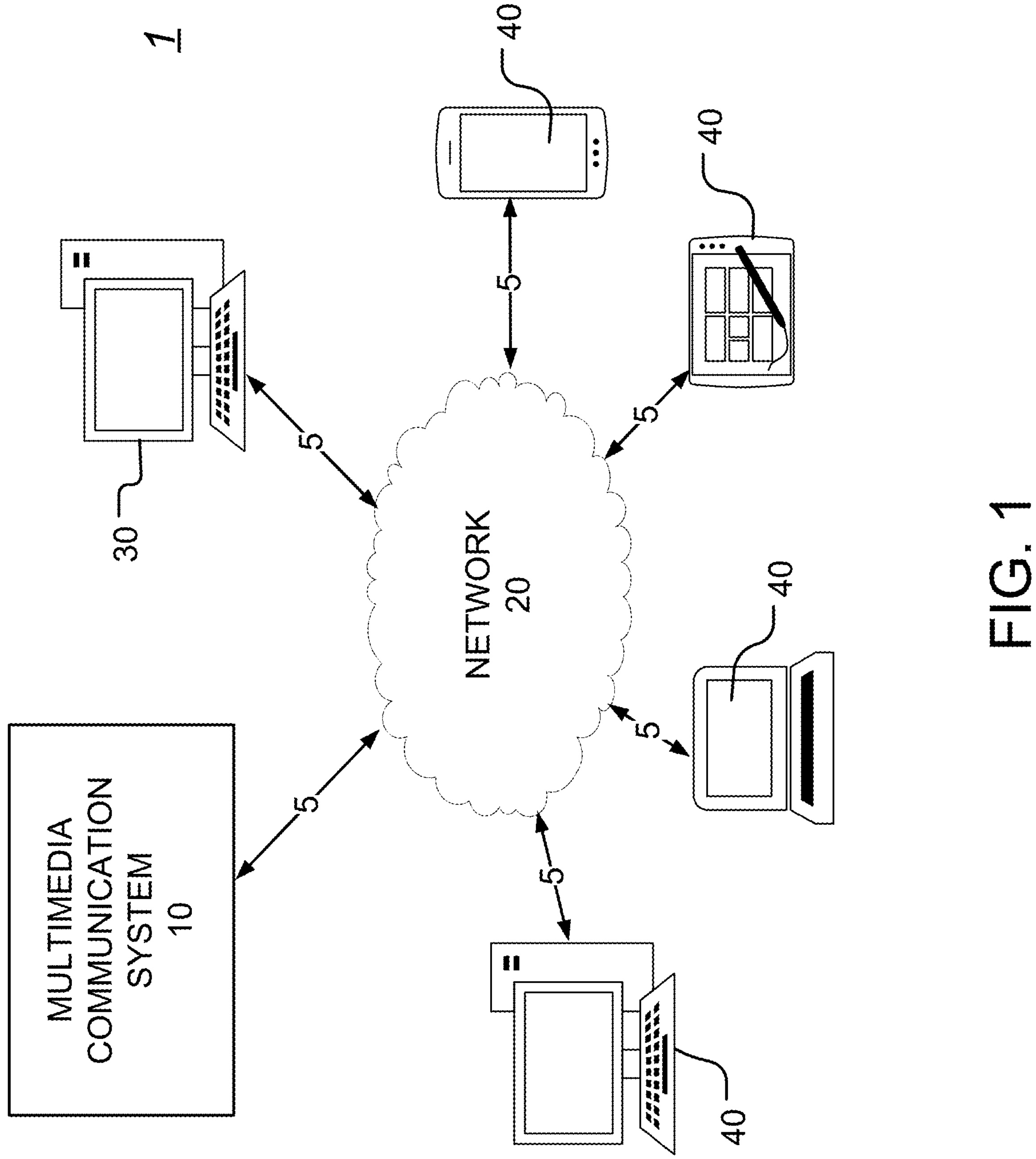
FIG. 1 depicts an example of an environment that includes a multimedia communication system that is constructed according to the principles of the disclosure.

The present disclosure is further described in the detailed description that follows.

DETAILED DESCRIPTION OF THE DISCLOSURE

The disclosure and the various features and advantageous details are explained more fully with reference to the non-limiting embodiments and examples that are described or illustrated in the accompanying drawings and detailed in the following description. It should be noted that the features illustrated in the drawings are not necessarily drawn to scale, and features of one embodiment can be employed with other embodiments, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those of skill in the art to practice the embodiments of the disclosure. Accordingly, the examples and embodiments should not be construed as limiting the scope of the disclosure. Moreover, it is noted that like reference numerals represent similar parts throughout the several views of the drawings.

The Internet is a network of networks that carries a vast range of information resources and services over a global system of interconnected computer networks that use the Internet protocol suite (TCP/IP) to link computing devices worldwide. The information resources typically include inter-linked hypertext documents and applications of the World Wide Web (WWW), electronic mail, telephony and file sharing. Hypertext is one of the key underlying concepts of the WWW, where webpages are often written in Hypertext Markup Language (HTML). Hypertext documents can either be static or dynamic. Static documents are typically prepared and stored in advance, whereas dynamic documents typically change continually, such as in response to user inputs.

Client-side computing devices such as the EUC devices 40 (shown in FIG. 1 and discussed below) typically access information resources on the Internet using web browsers that include Web APIs. An application programming interface (API) is a set of subroutine definitions, protocols and tools for building software and applications; and a Web API is an API that can be accessed and interacted with using HTTP commands. The HTTP protocol defines what actions client-side web browsers should take on the computing devices in response to various commands.

When a computing device like an EUC device 40 visits or otherwise accesses a website or a webpage, the device's web browser can retrieve the webpage from a web server that hosts the website or webpage. In order to graphically display the webpage, the web browser may need to access multiple web resource elements, such as style sheets, scripts, and images, while presenting each webpage. Generally, latency is not an issue, but can become problematic where the webpages include moving images such as, for example, streaming video. Since moving images typically require numerous frames of image data to be transmitted to the computing device, latency can become noticeable, especially where signal strength is low or intermittent.

The instant disclosure provides a technological solution that can significantly reduce latency in displaying moving images while simultaneously reducing data traffic transmission and bandwidth demand. The technological solution provides a system, method and computer program for rendering moving images on client-side computing devices with very low data consumption and fast transfer rates compared to state-of-the art technologies. The technological solution can include client-side web browsers that can access, download and process static image data, and, subsequently, generate and render moving images on a frame-by-frame based on the static image data. The technological solution can render moving images based on the static image data when the computing device is offline.

FIG. 1 is a block diagram depicting an implementation of a multimedia communication (MC) system 10 in a communication environment 1. The communication environment 1 can include a network 20, a content providing computing (CPC) device 30, and a plurality of end-user computing (EUC) devices 40. The components in the communication environment 1 can each transmit or receive data traffic through a link 5.

The MC system 10 can include at least one server. For instance, the MC system 10 can include a plurality of servers located in at least one data center or server farm. The MC system 10 can include one or more web servers.

The MC system 10 can be configured to provide multimedia content to the EUC devices 40. The MC system 10 can receive multimedia content from the CPC device 30 and modify the multimedia content to include image rendering commands for rendering static or moving image content in the multimedia content. Alternatively, the MC system 10 can receive or generate multimedia content locally and include image rendering commands, or modify the multimedia content to include image rendering commands. The MC system 10 can transmit the multimedia content, including image rending commands, to the EUC devices 40 via, for example, the network 20 and communication links 5. The multimedia content can be provided in a webpage, which can include static or moving image data that can be rendered as moving images on the EUC devices 40 based on associated image rendering commands included in the multimedia content. For example, the multimedia content can include an HTML document that is assisted by technologies such as Cascading Style Sheets (CSS) and scripting languages such as JavaScript. The image rendering commands can include JavaScript, which can be embedded in the HTML document to affect the behavior and content of the webpage when it is rendered on the EUC device 40.

The MC system 10 can include one or more web servers (not shown) that can be accessed by the EUC devices 40 via client-side web browsers. The web server(s) (not shown) can be located locally in the MC system 10, or remotely such as, for example, in the network 20. The web server(s) (not shown) can host a plurality of websites, each of which can include multimedia content that can be accessed and rendered by the EUC devices 40.

Alternatively, the multimedia content can be hosted by the CPC device 30 and accessed by the EUC devices 40. The CPC device 30 can include one or more web servers (not shown) that can host websites containing multimedia content.

The multimedia content can include primary content provided by the CPC device 30 or any other source (not shown). The CPC device 30 can be operated by a content provider or a publishing content provider. The primary content can include, for example, a webpage or website, a results page or a landing page of a search operator, a movie, a video, a television program or show, a photo, social media content, or any other visually perceptible content.

The CPC device 30 (or MC system 10) can operate the website of a publishing content provider and can provide primary content in, for example, one or more HTML documents for rendering and display as webpages. A webpage can include a content slot that can be configured for combining and displaying articles or content artifacts associated with the multimedia content.

The multimedia content can include static or moving image content provided by the CPC device 30 or any other source (not shown). The static image content can include a static image of an article, such as, for example, an object, a person, an animal or any other visually perceptible thing. The static image content can include a content artifact, such as, for example, a source identifier for the article or content source provider. The content artifact can include a name, a brand, a trademark, a logo, an image, or any other visually perceptible information that can identify the article or content provider. The static image content can include a static image of one or both of the article and the content artifact. FIG. 3 shows a non-limiting example of an article 210, which can be rendered to display a content artifact such as, for example, the trademark (not shown) on the article 210.

The MC system 10 can insert, combine or overlay static or moving image content in or on the primary content. For instance, the MC system 10 can insert or overlay static or moving image content in one or more content insertion slots in the primary content, such as, for example, by inserting a static image of an article or content artifact in a displayable portion of the primary content so that the static image content is rendered and displayed with the primary content by the EUC devices 40. For example, the EUC device 40 can access a webpage by means of a web browser and render the primary content in the webpage and, at the same time, render and display a moving image within, combined with or overlaid onto the primary content, where the moving image content can be rendered by the web browser on the EUC device 40 based on the static image content data and image rendering commands received from MC system 10 (or CPC device 30). The primary content can be rendered by the EUC device 40 as, for example, a webpage, a search results page or a landing page. As noted earlier, the multimedia content, including primary content and static image content, can include HTML documents, which can include embedded CSS and JavaScript code to, when executed by the web browser, cause the EUC device 40 to render the primary content and static image content on the display of the EUC device 40, as well as render an animation or moving image on a frame-by-frame basis from a still image contained in the static image content.

The content slot for the static or moving image content can be defined by the MC system 10, including a width, a height, a height-to-width ratio, a shape, or a location for the content slot on a display area of, for example, a webpage. The MC system 10 can provide image rendering commands that can include data and instructions that define the content slot and how it appears with or in the primary content, including a width (or range of widths), a height (or range of heights), a shape (or range of shapes), or a location (or range of locations) for the content slot and how the articles or content artifacts can be displayed on a display screen with, within or on the primary content.

Alternatively, the content slot can include a static or moving image in the primary content. The static image can be selected by the MC system 10 and image rendering commands generated that define how the static image will be processed and rendered into an animation or moving image by the client-side web browser at the EUC devices 40.

The CPC device 30 (or MC system 10) can include a computing device of a search engine operator that operates a search engine website. The primary content of a search engine website, such as, for example, a search results webpage or a landing webpage, can include the results of a search or the landing webpage can be displayed with the static or moving image content. The static or moving image content can be rendered by itself or with the primary content, such as, for example, in a content slot on the search results webpage or landing webpage.

The EUC device 40 can include a display device. The EUC device 40 can be configured to communicate via the network 20 and, by executing image rendering commands in the web browser, render and display a frame for a moving image on a frame-by-frame basis and on the fly based on static image content in the received multimedia content. The EUC device 40 can interface with an end user to submit requests to receive multimedia content. The requests can be requests to a search engine and the requests can include search queries. The requests can include a request to access a webpage or website.

The EUC device 40 can render and display the primary content or static image content received over the network 20. The EUC device 40 can display the primary content or the static image content on a display screen. The static image content can be dynamic and automatically adjusted (for example, based on received image rendering commands) in terms of position, layout, shape, size, texture, or any other visually perceptible characteristic on the display device of the EUC device 40. The static or moving image content can be adjusted over time based on the image rendering commands in the multimedia content. The image rendering commands can be parsed from the multimedia content and processed locally at the EUC device 40 by, for example, a web browser. The image rendering commands can include data or instructions (for example, JavaScript) to generate/render animated or moving images from a still image on a frame-by-frame basis and on the fly based on the static image content on the EUC device 40.

The image rendering commands can include markup language annotations for identifying content and creating or modifying images, links, sounds, or other objects. The markup language annotations can include a plurality of tags for displaying static or moving image content such as, for example, shown in FIGS. 3A-12 on the EUC devices 40. The markup language can include, for example, one or more of: Standard Generalized Markup Language (SGML), Scalable Vector Graphics (SVG), Hypertext Markup Language (HTML), Extensible Markup Language (XHTML or XML), XML User Interface Language (XUL), LaTeX, or any other markup language that can be used by the web browsers for rendering static images as moving images on the EUC devices 40. The markup language annotations can be executed by, for example, a web browser running on the EUC device 40 to render animated images from the static image content on its display device.

The rendering commands can include style sheet language annotations for providing rules for stylistics and for describing the presentation of the static image content with the markup language annotations. The style sheet language annotations can include, for example, colors, fonts, layouts, or other stylistic properties. The style sheet language can include, for example, one or more of: Cascading Style Sheet (CSS), Document Style Semantics and Specification Language (DSSSL), or Extensible Stylesheet Language (XSL). The style sheet language annotations can be provided as a style sheet language file. Alternatively, the style sheet language annotations can be incorporated into the file containing the markup language annotations.

The rendering commands can include scripting language instructions to create interactive effects related to the markup language annotations or style sheet language annotations. The scripting language can include, for example, Bash (e.g., for Unix operating systems), ECMAScript (or JavaScript) (e.g., for web browsers), Visual Basic (e.g., for Microsoft applications), Lua, or Python. The scripting language instructions can include instructions that, when executed by, for example, the web browser on the EUC device 40, effectuate rendering of animated or moving images such as those shown in FIGS. 3A-12 on the display device of the EUC device 40 based on still image data provided in the static image content. In a non-limiting embodiment, the scripting language instructions can include CanvasRenderingContext2d.drawImage method of a Canvas 2D API that can be included in the EUC device 40 and invoked to provide different ways to draw an image onto the canvas. The scripting language instructions can be provided as a scripting language file. Alternatively, the scripting language instructions can be incorporated into the file containing the markup language annotations.

The scripting language instructions can rely on a run-time environment such as a web browser in the EUC device 40 to provide objects and methods by which scripts can interact with the environment, such as, for example, a webpage document object model (DOM) that can work with an XML or HTML document. The scripting language instructions can also rely on the run-time environment to provide the ability to include or import scripts, such as for example, HTML <script> elements. The scripting language instructions can include, for example, JavaScript instructions, which can effectuate processing of static image content by, for example, a JavaScript engine, from a queue one at a time. For instance, JavaScript can call a function associated with each new static image content, creating a call stack frame with the function's arguments and local variables. The call stack can shrink and grow based on the function's needs. When the call stack is empty upon function completion, JavaScript can proceed to the next static image content in the queue.

The scripting language instructions can be used by the web browser in the EUC device 40 to slice static image data into a plurality of rows or columns of pixel data, manipulate one or more of the rows or columns relative to one another to render an animated or moving image on the fly on a frame-by-frame basis that includes, for example, a breathing effect (shown in FIGS. 3A and 3B), a psychedelic effect (shown in FIG. 4), a wave effect (shown in FIGS. 5-12), or any other visually perceptible animation of the static image. The scripting language instruction can include instructions to render the moving image on a frame-by-frame basis from the still image in the multimedia content by slicing the still image into a plurality of rows or columns of pixels and modifying a subset of the plurality of rows or columns of pixels between frames. The subset can include all or less than all of the rows or columns of pixels in a frame. Modifying the subset of rows or columns can include, for example, shifting all or less than all of the rows or columns of pixels in a frame with respect to each other to render additional frames on a frame-by-frame basis to provide, for example, the wave effect (shown in, for example, FIGS. 5 and 6).

Modifying the subset of rows or columns can include, for example, discarding or scaling pixel data for one or more pixels in a row or column of pixels in a frame to create a squeezing or breathing-in effect along a length or width of row or column (shown in, for example, FIG. 3A), thereby shortening the length or width of the row or column with respect to adjacent rows or columns. Modifying the subset of rows or columns can include, for example, or interpolating pixel data for adjacent pixels to generate and add one or more pixels in a row or column of pixels in a frame to create an expanding or breathing-out effect (shown in, for example, FIG. 3B). For instance, the luminosity (or pixel or color) value for each of a pair of adjacent pixels in a row or column can be averaged to generate a pixel value for a pixel that can be rendered and displayed between the pair of adjacent pixels, thereby expanding the image by, for example, 50%.

Depending on the computing resources installed in the EUC device 40, a message such as, for example, an SMS (Short Message Service) message or an email message can be opened on the EUC device 40 and a static image in the message processed according to the scripting language instructions to render an animation or moving image of the article or content artifact by generating a plurality of sequential frames from the static image data and displaying the frames at a frame rate that causes the frames to be perceived as a moving image (such as, for example, 24 frames/second, 30 frames/second, or 60 frames/second).

The image rendering commands can include a document object model (DOM) such as for HTML or XML (e.g., DOM5 HTML) that can create object-oriented representations of the static image content that can be modified with the scripting language instructions. A DOM can include a cross-platform or language-independent convention for representing and interacting with objects in HTML, XHTML/XML, SGML, SVG, or XUL.

The EUC devices 40 can include one or more user interface devices (not shown). In general, a user interface device can be any electronic device that conveys data to a user by generating sensory information (for example, a visualization on a display, one or more sounds, a haptic production (for example, Braille produced on a haptic display, or a vibration), or converting received sensory information from a user into electronic signals (for example, a keyboard, a mouse, a pointing device, a touch screen display, or a microphone). The one or more user interface devices can be internal to a housing of the EUC device 40 (for example, a built-in display, keyboard, microphone, or touchpad) or external to the housing (for example, a display device, camera, speaker or microphone connected to the EUC device 40).

The EUC device 40 can include an electronic display device that visually displays webpages using webpage data and instructions received from one or more content sources such as the CPC device 30, or from the MC system 10 via the network 20.

Figure 2:
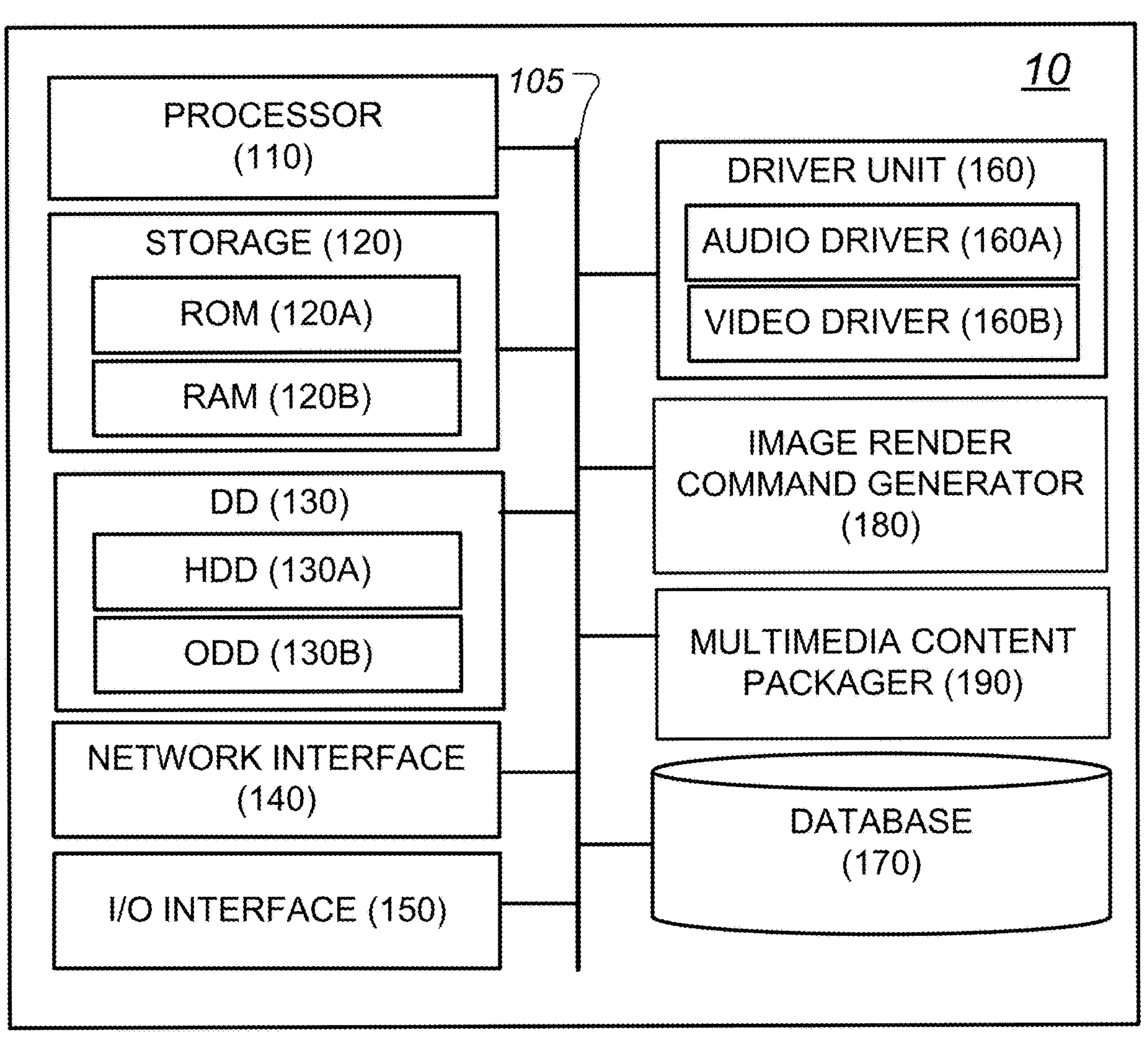
FIG. 2 depicts a non-limiting embodiment of the multimedia content system, constructed according to the principles of the disclosure.

FIG. 2 is a block diagram depicting a non-limiting embodiment of the MC system 10, constructed according to the principles of the disclosure. As noted above, the MC system 10 can include one or more web servers (not shown). The MC system 10 can be configured to implement the various aspects of the disclosure. The MC system 10 can include a processor 110, a storage 120, a disk drive (DD) 130, a network interface 140, an input/output (I/O) interface 150, a driver unit 160, a database 170 and a system bus 105. The MC system 10 can include an imager render command generator 180. The MC system 10 can include a multimedia content packager 190. The system bus 105 can be communicatively linked to each of the components 110 to 190 in the MC system 10 by a communication link. Any one or more of the components 120 to 190 can include a device or a module that is separate from the processor 110, as seen in FIG. 2, or integrated or integratable in a device(s) such as the processor 110. The MC system 10 can include a sound generation device (not shown), such as, for example, a speaker, or video generation device such as a display device (not shown).

The MC system 10 can also include one or more high-speed interfaces (not shown), high-speed expansion ports (not shown), low speed interfaces (not shown) or mass storage devices (not shown), which can be interconnected using various busses, and can be mounted on a common motherboard or in other manners as appropriate.

The system bus 105 can include any of several types of bus structures that can further interconnect to a memory bus (with or without a memory controller), a peripheral bus, and a local bus using any of a variety of commercially available bus architectures. The system bus 105 can include a backbone.

The processor 110 can include any of various commercially available graphic processing unit devices. Dual microprocessors and other multi-processor architectures can be included in the processor 110. The processor 110 can include a central processing unit (CPU) or a graphic processing unit (GPU). The processor 110 includes a computing device.

The processor 110 can process instructions for execution within the MC system 10, including instructions stored in the storage 120. The processor 110 can process instructions to display graphical information for a graphic user interface (GUI) on an external input/output device, such as a display device coupled to the I/O interface 150 or the high-speed interface (not shown). In other implementations, multiple processors and/or multiple buses may be used, as appropriate, along with multiple memories and types of memory.

The MC system 10 can include a computer-readable medium that can hold executable or interpretable computer code (or instructions) that, when executed by the processor 110 or one or more of the components (e.g., devices or modules) in the MC system 10, causes the steps, processes and methods in this disclosure to be carried out. The computer-readable medium can be provided in the storage 120 or DD 130. The computer readable medium can include sections of computer code or instructions that, when executed cause the MC system 10 or EUC device 40 to carry out a process 300 (shown in FIG. 13 or 14), as well as all other process steps described or contemplated in this disclosure.

The storage 120 can include a read only memory (ROM) 120A and a random-access memory (RAM) 120B. A basic input/output system (BIOS) can be stored in the non-volatile memory 120A, which can include, for example, a ROM, an EPROM, or an EEPROM. The BIOS can contain the basic routines that help to transfer information between components in the MC system 10, such as during start-up. The RAM 120B can include a high-speed RAM such as static RAM for caching data.

The DD 130 can include a hard disk drive (HDD) 130A and an optical disk drive (ODD) 130B. The HDD 130A can include, for example, an enhanced integrated drive electronics (EIDE) drive, a serial advanced technology attachments (SATA) drive, or any other hard drive device; and, the ODD 130B can include, for example, a read/write from/to a CD-ROM disk (not shown), or read from or write to other high capacity optical media such as a digital versatile disc (DVD). The HDD 130A can be configured for external use in a suitable chassis (not shown). The DD 130 can be connected to the system bus 105 by a hard disk drive interface (not shown) and an optical drive interface (not shown), respectively. The hard disk drive interface (not shown) can include a Universal Serial Bus (USB) (not shown), an IEEE 1394 interface (not shown), or any other suitable interface for external applications.

The storage 120 or DD 130, including computer-readable media, can provide nonvolatile storage of data, data structures, and computer-executable instructions. The storage 120 or DD 130 can accommodate the storage of any data in a suitable digital format. The storage 120 or DD 130 can include one or more apps that are used to execute aspects of the architecture described herein. The storage 120 or DD 130 can include, for example, flash memory or NVRAM memory.

One or more program modules can be stored in the storage 120 or DD 130, including an operating system (not shown), one or more application programs (not shown), one or more APIs, and program data (not shown). The APIs can include, for example, Web APIs, simple object access protocol (SOAP) APIs, remote procedure call (RPC) APIs, representation state transfer (REST) APIs, or other utilities and services APIs. Any (or all) of the operating system, application programs, program modules, and program data can be cached in the RAM 120B as executable sections of computer code.

The network interface 140 can be connected to a network such as the network 20 (shown in FIG. 1). The network interface 140 can be connected, via the network 20 and/or communication links 5, to the CPC device 30 (shown in FIG. 1) or to one or more EUC devices 40 (shown in FIG. 1). The network interface 140 can include a wired or a wireless communication network interface (not shown) or a modem (not shown). When used in a local area network (LAN), the MC system 10 can be connected to the LAN network through the wired or wireless communication network interface; and, when used in a wide area network (WAN), the MC system 10 can be connected to the WAN network through the modem. The network 20 (shown in FIG. 1) can include a LAN, a WAN, the Internet, or any other network. The modem (not shown) can be internal or external and wired or wireless. The modem can be connected to the system bus 105 via, for example, a serial port interface (not shown).

The (I/O) interface 150 can receive commands and data from an operator. The I/O interface 150 can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 150 as instruction and data signals via the bus 105 to any component in the MC system 10.

The driver unit 160 can include an audio driver 160A and a video driver 160B. The audio driver 160A can include a sound card, a sound driver (not shown), an interactive voice response (IVR) unit, or any other device necessary to render a sound signal on a sound production device (not shown), such as for example, a speaker (not shown). The video driver 160B can include a video card (not shown), a graphics driver (not shown), a video adaptor (not shown), or any other device necessary to render an image signal on a display device (not shown).

The image render command (IRC) generator 180 can include a computing device or module, or it can be included in a computing device or module. The IRC generator 180 can include one or more platform-neutral or platform-agnostic APIs. The IRC generator 180 can include one or more image rendering applications or APIs. The image rendering applications or APIs can include data or instructions that might be specific to computing resources used in EUC devices 40 (shown in FIG. 1). For instance, the data or instructions can be specific to computing resources such as, for example, web browsers that use JavaScript. The image rendering applications can include data or instructions provided by a publishing content provider via, for example, the CPC device 30 (shown in FIG. 1), or any other data or instructions that ensure proper display and rendering of animated images on the EUC devices 40.

The IRC generator 180 can include an API for a markup language such as, for example, SGML, SVG, HTML, XHTML/XML, XUL, or LaTeX. The IRC generator 180 can include an image rendering API such as, for example, Canvas API that includes the CanvasRenderingContext2D interface to provide two-dimensional (2D) rendering content for a drawing surface or image of an HTML canvas element, which can allow for dynamic, scriptable rendering of 2D shapes and bitmap images.

In a non-limiting embodiment, the IRC generator 180 can generate image rendering commands using the CanvasRenderingContext2D interface in the Canvas API for 2D rendering context of static image content. In this embodiment, the static image content can be identified as a <canvas> element in HTML. The static image content can include, for example, Scalable Vector Graphics (SVG), Portable Network Graphics (PNG), Joint Photographic Experts Group (JPEG), Graphics Interchange Format (GIF), HTML5 Canvas, or any other suitable image format.

The image rendering commands can include, for example, HTML, CSS and JavaScript instructions and data, which can be embedded in, for example, one or more HTML documents containing multimedia content. The image rendering commands can be used by a client-side Web API on the EUC device 40 such as, for example, a canvas scripting API, JavaScript API, or WebGL API to render graphics or animations based on the static image content. The image rendering commands can include parameters for the static image content (CanvasImageSource) such as, for example, CSSImageValue, HTMLImageElement, SVGImageElement, HTML VideoElement, HTMLCanvasElement, ImageBitmap, or an OffscreenCanvas. The parameters can include an x-coordinate or a y-coordinate in an x-y plane that represents the display screen where the static image content is to be rendered on the EUC device 40, a width w that represents the width of the static image content, and a height h that represent the height of the static image content. The parameters can vary as a function of time, such that the parameters that define the rendered image can cause the rendered image to vary in shape, size, or position on the display screen of the EUC device 40.

The IRC generator 180 can include an API for a style sheet language, such as, for example, CSS, DSSSL, or XSL. The IRC generator 180 can include a Web API, an operating system API, a database system API, a computer hardware API, or a library API. The IRC generator 180 can include, for example, one or more of the APIs available at <<https://developers.google.com>>. The IRC generator 180 can include one or more APIs that connect webpages to scripts or programing languages, including modelling (e.g., SGML, SVG, HTML, XHTML/XML, or XUL) documents as objects.

The IRC generator 180 can include a document object model (DOM) API, such as for HTML or XML, that can create object-oriented representations of webpages that can be modified with a scripting module in the multimedia content packager 190. A DOM can include a cross-platform or language-independent convention for representing and interacting with objects in one or more of HTML, XHTML/XML, SGML, SVG, or XUL.

The IRC generator 180 can include a scripting module that can provide a special run-time environment that can automate the execution of tasks. The scripting module can include one or more scripting languages, which can range from domain-specific languages to general-purpose languages, such as, for example, Bash (for example, for Unix operating systems), ECMAScript (or JavaScript) (for example, for web browsers), Visual Basic (for example, for Microsoft applications), Lua, or Python. The IRC generator 180 can include one or more of the scripting modules found at, for example, <<https://developers.google.com/apps-script/>>.

The rendering script can be included in the image rendering commands generated by the IRC generator 180 and downloaded from MC system 10 (or CPC device 30, shown in FIG. 1) with the associated static image content to the EUC device 40, where it can be processed by a computing resource such as, for example, a web browser to render a moving image on the EUC device 40. The static image content can be included in the webpage that is accessed and rendered on the EUC device 40.

The rendering script can be configured to cause the EUC device 40, after a webpage is loaded by the EUC device 40, to render an animation or moving image of a static image on the EUC device 40 such as, for example, on a frame-by-frame basis. The webpage and the image rendering commands can be received from the MC system 10 by the EUC device 40. The image rendering commands can be embedded in the webpage. The image rendering commands can, when invoked by a client-side web browser, cause the EUC device 40 to render a moving image based on the static image content. The image rendering commands can be configured to cause the EUC device 40 to properly render an animated or moving image of the static image content on its display screen.

The image rendering commands can include computer executable code or instructions or sets of instructions that, when executed by a computing resource in an EUC device 40 such as web browser, cause the EUC device 40 to render one or more animated images, based on the static image data, with varying size, shape, color, texture, position, or layout. The image rendering commands can define how the static image content is modified over time to render the animated or moving image on the EUC device 40, including, for example, frame-by-frame animation based on a single still image frame.

In the case of HTML5, the image rendering commands can include one or more of a video tag (for example, an instruction to embed video in the displayed screen and how to play it), a source tag (for example, used with audio or video to identify a source for the audio or video), an embed tag (for example, an instruction to embed specified media type for content that might lack support within other media elements), a canvas tag (for example, an instruction to set aside part of the display screen), or a svg tag (for example, an instruction to embed vector graphics encoded with SVG markup language, to allow graphics to be scaled dynamically to the area and shape of the display screen without losing any graphic quality). In the HTML document, an img element can be created to act as a container for the still image that is to be rendered as an animation or moving image. In rendering an animation or moving image, it may become necessary to replace an existing image frame with the next one in the frame-by-frame animation rendering so as to create the visual perception of movement. This can be done in HTML using, for example, setTimeout, requestAnimationFrame or any other suitable instruction. As will be understood by those skilled in the art, the image rendering commands can include other tags that, when referenced by, for example, a style sheet language, cause the EUC device 40 to render the animated image, with or without the primary content, to have a location, layout, size, shape, color, texture, or special effect that is optimal for the particular EUC device 40.

For instance, using the canvas tag in HTML5, a portion of a display screen on an EUC device 40 can be targeted for rendering of the animated or moving image (or new canvas window) for insertion of the animated or moving image, including the height and width of the canvas which might be measured from an upper-left corner of the display screen. The canvas window can be arranged to match the size of the static image content. A function can be called to display the animated image in the new canvas window on the EUC device 40 display screen.

According to an implementation of the technological solution, upon receiving multimedia content at the EUC device 40, the image rendering commands can be parsed from the multimedia content and invoked (for example, by the JavaScript engine in the web browser) to cause the EUC device 40 to load the associated static image content into a cache memory, slice the image into a plurality of rows or columns of pixels, transform the pixels and generate a composite rendering.

The multimedia content (MC) packager 190 can include a computing device or module, or it can be included in a computing device or module. The MC packager 190 can be configured to receive image rendering commands from the IRC generator 180 for associated static image content and combine the image rendering commands with static image content into multimedia content packets that can be transmitted to the EUC devices 40. The MC packager 190 can also receive primary content and include the content in the multimedia contents packets. The MC packager 190 can build, for example, HTML documents and embed multimedia content in the HTML documents, including primary content, static content or image rendering commands. The MC packager 190 can embed static image content (including image rendering commands) in the webpage, or provide the static image content as ancillary data or instructions. The MC packager 190 can assemble the multimedia content into a plurality of data packets for transmission to the EUC devices 40.

The multimedia content packets can be transmitted to the EUC devices 40 over the network 20 (shown in FIG. 1), where the packets can be parsed and static image content and associated image rendering commands separated, as well as primary content, if included in the multimedia content packets. A computing resource such as a runtime environment (for example, web browser) in the EUC device 40 can cause a webpage to be rendered by the EUC device 40 (shown in FIG. 1), including webpage data and instructions (for example, web page code), and rendering script such as JavaScript can be invoked to render an animated or moving image on a frame-by-frame basis and on the fly based on the static image content and associated image rendering commands.

When the web browser running on the EUC device 40 modifies an attribute value, the matching criteria can change, which in turn can trigger a change of what is being rendered in place of the <content> HTML element. The EUC device 40 can render frame-by-frame animations or moving images based on a single still frame. User interfaces of web applications, and components of the user interfaces, can be manipulated, modified, and enhanced, without requiring changes to the basic code of the document markup of the web application model.

The database 170 can store the multimedia content created by the multimedia content packager 190, including static image content and associated image rendering commands. The multimedia content can be stored as multimedia files and associated with the CPC device 30 or the multimedia content provider.

The CPC device 30 (or MC system 10) can include a graphic user interface (GUI) that can display the one or more fields to enter or upload static image content. The one or more fields can be configured to receive image rendering commands for the static image content. The image rendering commands can be entered into the fields by a user by means of a user interface or autonomously by the CPC device 30 or MC system 10. The entered image rendering commands can include, for example, one or more instructions relating to the location, layout, shape, size, color, texture, or special effect for the static image content. The image rendering commands can define what, where, when, and how the static image content is to be rendered on the EUC device 40, including the location, layout, shape, size, color, texture, or special effect, which can include, for example, a breathing effect (shown in FIG. 3), a psychedelic effect (shown in FIG. 4), a wave effect (shown in FIGS. 5-12), or any other visually perceptible animation of the static image content.

Figure 3A:
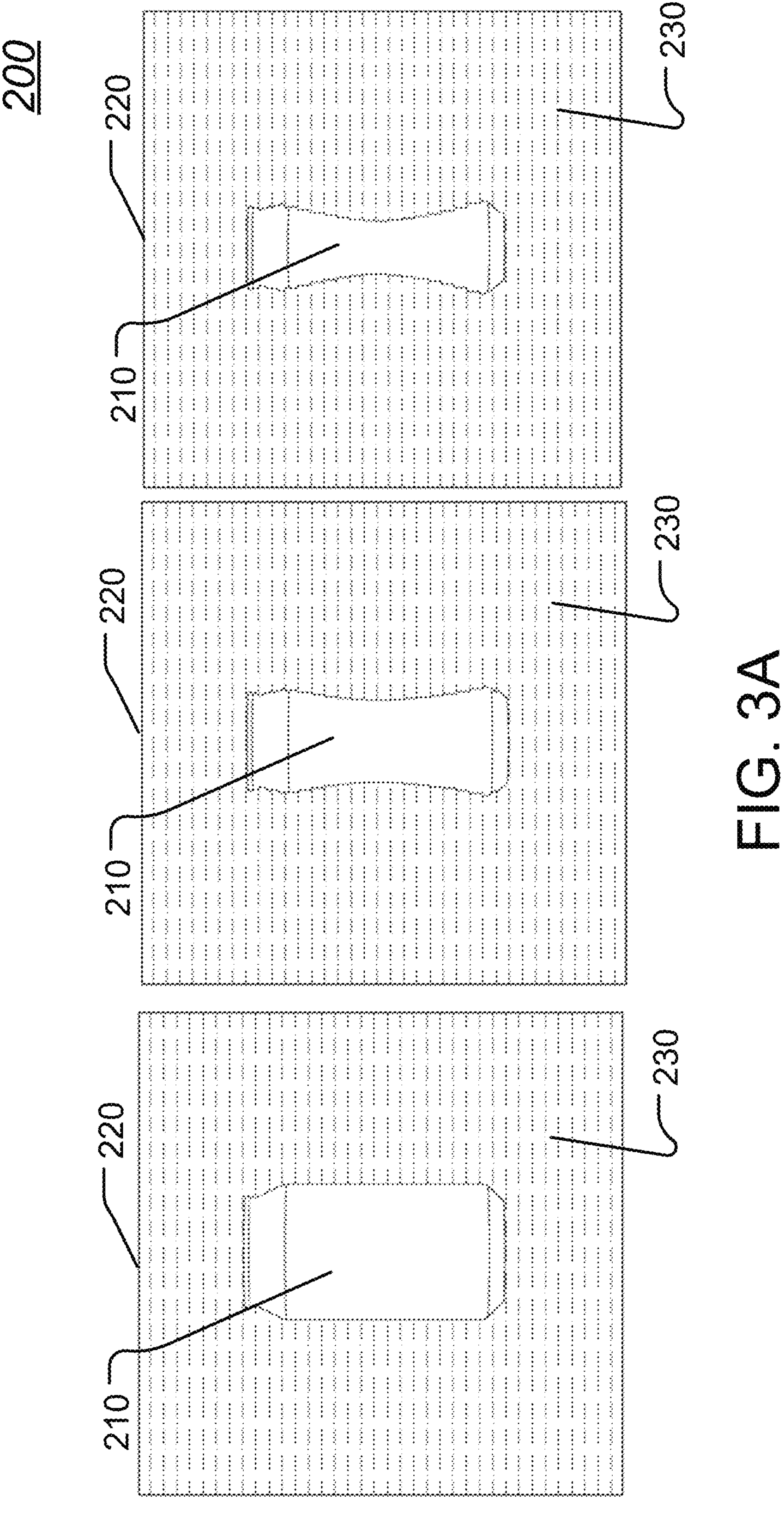
FIGS. 3A and 3B depict examples of a breathing effect for an article that can be rendered on a display screen of an end user computing device.
Figure 3B:
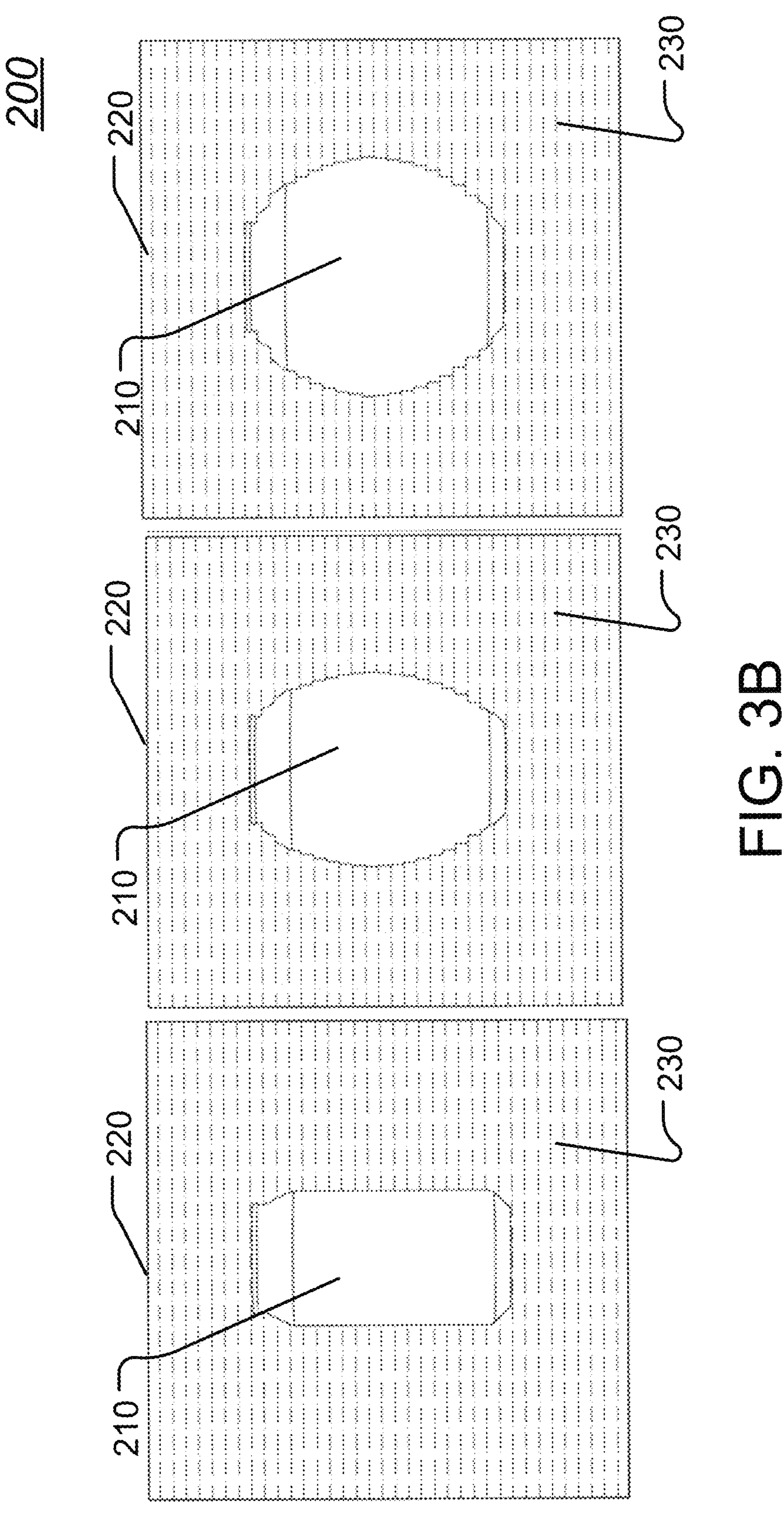

FIGS. 3A and 3B show examples of a breathing effect for an article 210 that can be rendered on the display screen of the EUC device 40. The article 210 can be rendered initially in its original static image form, as seen in the left-most frame 210. The image pixels can be sliced horizontally into a plurality of rows 230 of pixels, and the pixels can be transformed such that the article 210 can be rendered as contracting (or breathing) inward over time, rendering a sequence of image frames 220 (for example, three image frames) that show the article 210 contracting from its form shown in the left-most image frame 220, to the form shown in the middle image frame 220 and then to the form shown in the right-most image frame 220.

For instance, in the non-limiting example shown in FIG. 3, pixel data in certain rows can be dropped, interpolated, or otherwise modified to reduce the widths of the rows compared to adjacent rows, thereby rendering an image frame with an image that appears to be squeezed or compressed increasingly for rows that are located closer to the middle of the article 210 as compared to rows that are higher up or lower down from the row. This is illustrated in the three rendered image frames 220, where the rows of pixels are reduced in width such that the article 210 is perceived as breathing in, when moving from left-most frame 220 to right-most frame 220, or breathing out when moving from right-most frame 220 to left-most frame 220.

Upon reaching the fully contracted position (for example, right-most image frame 220), the article 210 can then be rendered as expanding (breathing) outward, with article 210 being rendered in the forms shown from the right-most image frame 220, through the middle image frame 220 to the left-most image frame 220. The repeating sequence (breathing in—breathing out—breathing in) can be repeated for a predetermined amount of time, which can be defined in the image rendering commands or by the user of the EUC device 40. Thus, the article 210, which in this example is a soda can, can be rendered as a moving image that shows the article 210 repeatedly breathing in and breathing out.

The following is a non-limiting example of data and instructions that can be included in the image rendering commands to cause the web browser in the EUC device 40 to render the article 210 with the breathing effect. Depending on the particular computing resources in the EUC device 40, the particulars of the static image content, or the desired effects, the image rendering commands can include data or instructions that are entirely different from the following, as understood by those skilled in the art. A Computer Program Listing Appendix submitted in ASCII text format pursuant to 37 C.F.R. §1.96(c) is incorporated by reference herein. The Computer Program Listing Appendix includes one ASCII text file, named "program_listing.txt", created on May 19, 2026, and a total of 432 lines.

Figure 4:
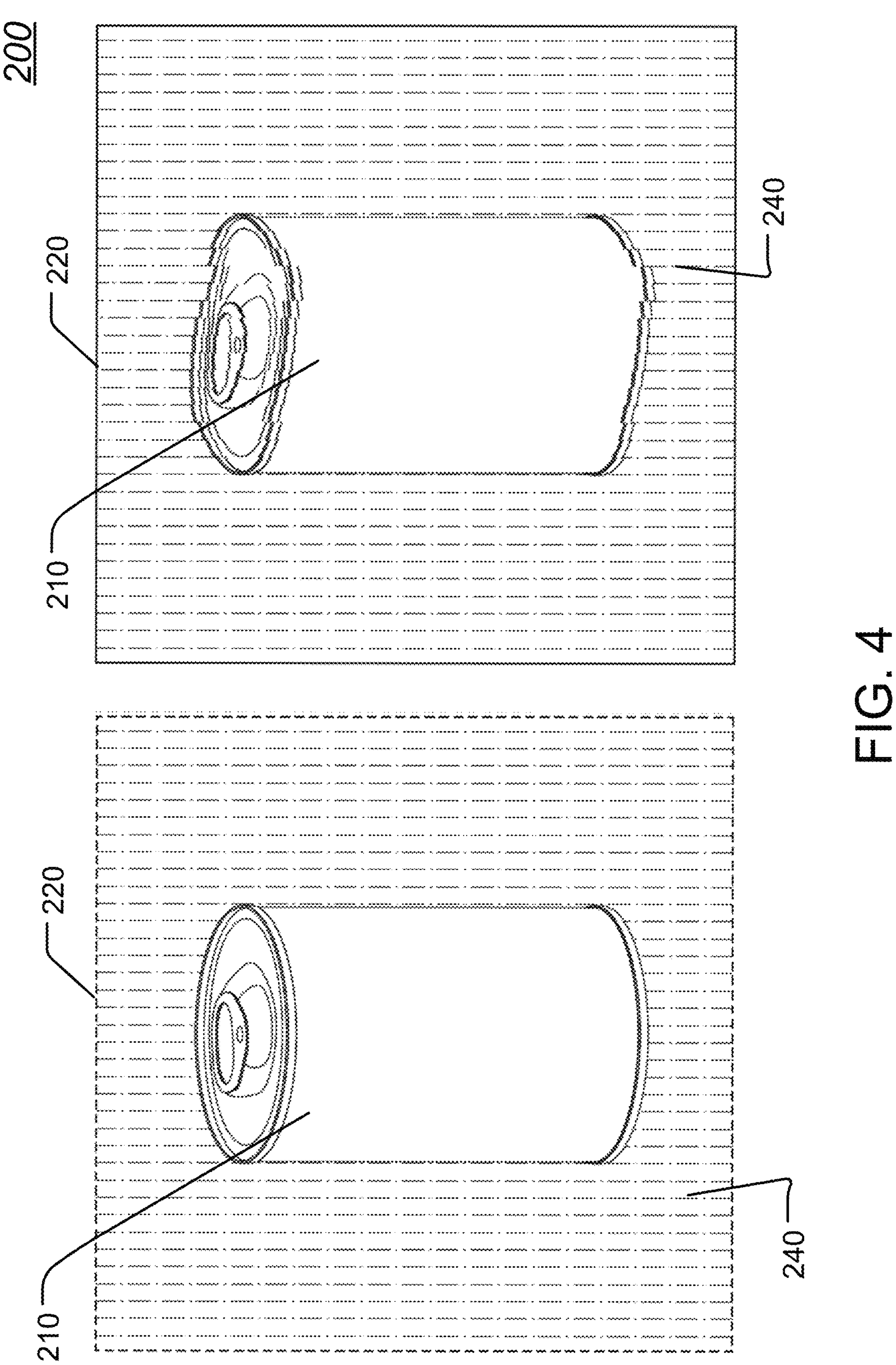
FIG. 4 depicts an example of a psychedelic effect for an article that can be rendered on the display screen of the end user computing device.

FIG. 4 shows an example of a psychedelic effect for an article 210 that can be rendered on the display screen of the EUC device 40. The article 210 can be rendered initially in its original static image form, as seen in the left-most frame 220. The image pixels can be sliced vertically into a plurality of columns 240 of pixels, and the pixels can be transformed such that the article 210 can be rendered as distorting over time, rendering a sequence of image frames 220 (for example, two image frames) that show the article 210 warping from its form shown in the left image frame 220 to the form shown in the right image frame 220. For instance, certain of the columns 240 of pixels can be shifted vertically with respect to adjacent columns 240 of pixels. Upon reaching the fully warped position (for example, right image frame 220), the article 210 can then be rendered as correcting or reversing to its original form, with article 210 being rendered in the forms shown from the right image frame 220 to the left image frame 220. The sequence of rendered image frames 220 can be repeated (e.g., from left-to-right and back from right-to-left) for a predetermined amount of time, which can be defined in the image rendering commands or by the user of the EUC device 40.

FIGS. 5-12 show various examples of a wave effect for a static image that can be rendered on the display screen of the EUC device 40. Each of FIGS. 5-12 shows a different article 210 that can be rendered from the static image content. As seen in each of the Figures, the article 210 can be rendered initially in its original static image form, as seen in the left-most frame 220. The image pixels can be sliced vertically into a plurality of columns 240 of pixels, and the columns 240 of pixels can be transformed such that certain columns of pixels shift up or down with respect to adjacent columns so that the article 210 can be rendered as shifting over time so that it appears, for example, like a flag waving in the wind when rendered in a sequence of image frames 220. Although the FIGS. Illustrate only a small number of frames (for example, two image frames), it is understood that many frames (for example, hundreds of image frames) can be generated to show the article 210 waving over time.

Figure 5:
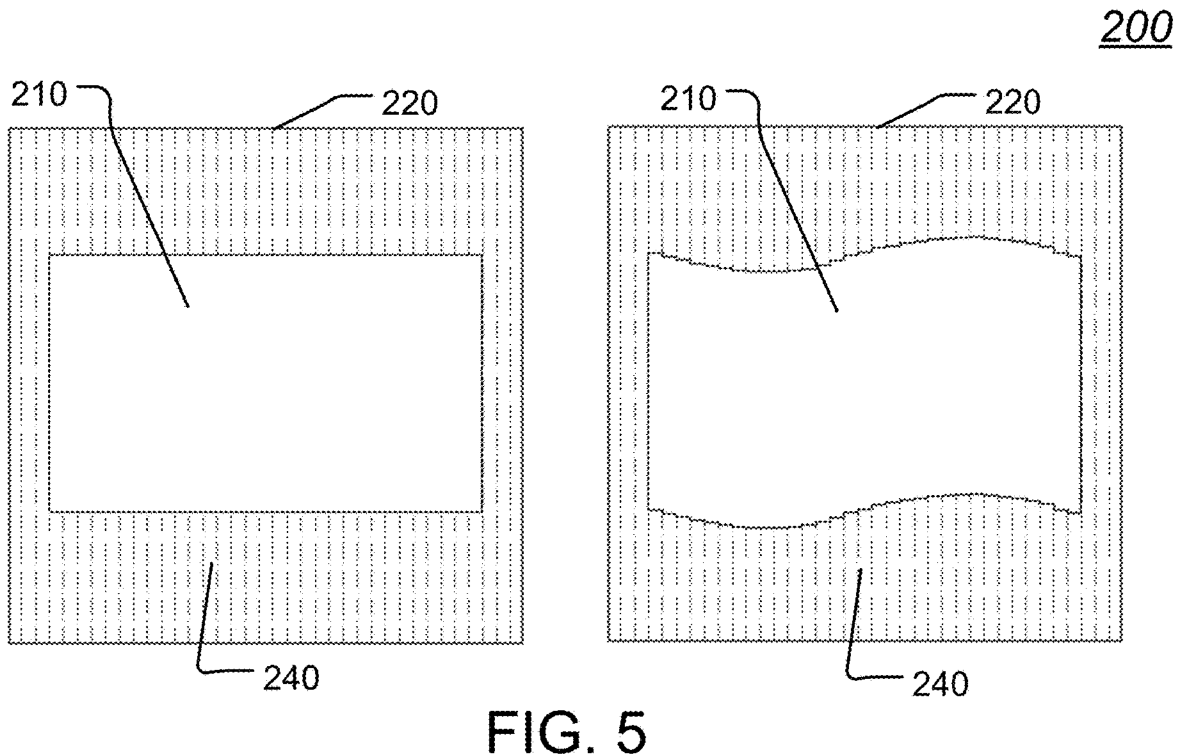
FIGS. 5-12 depict examples of a wave effect for an article that can be rendered on the display screen of the end user computing device.
Figure 6:
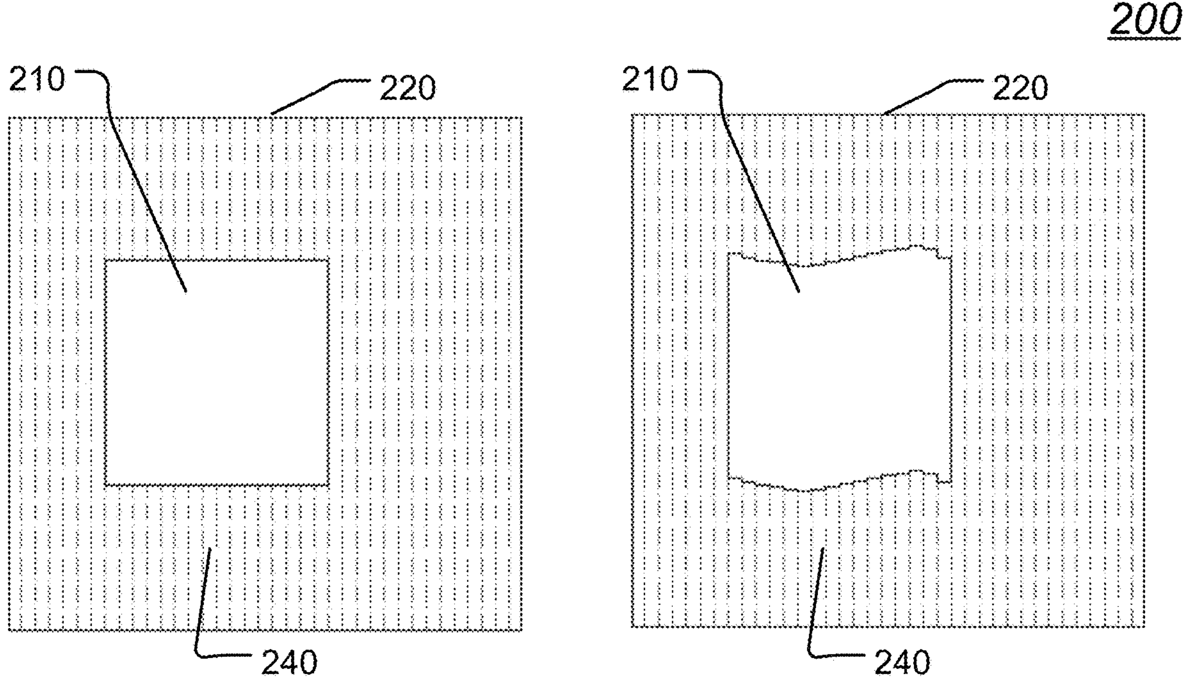
Figure 7:
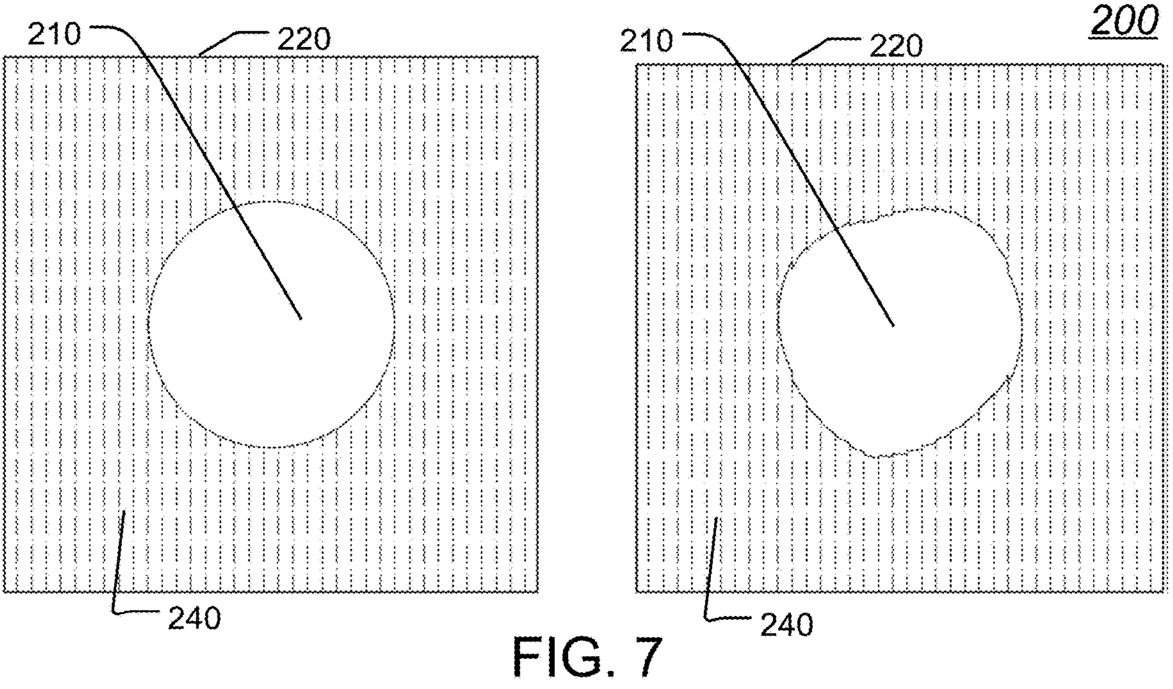
Figure 8:
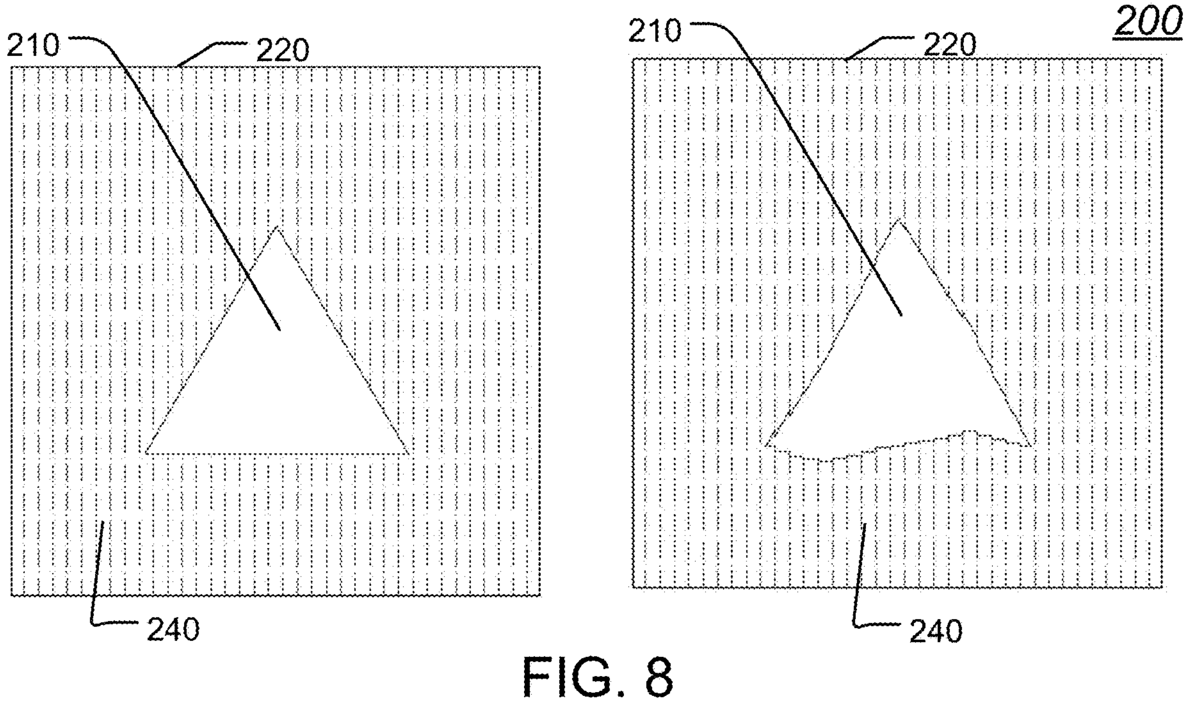
Figures 9, 10:
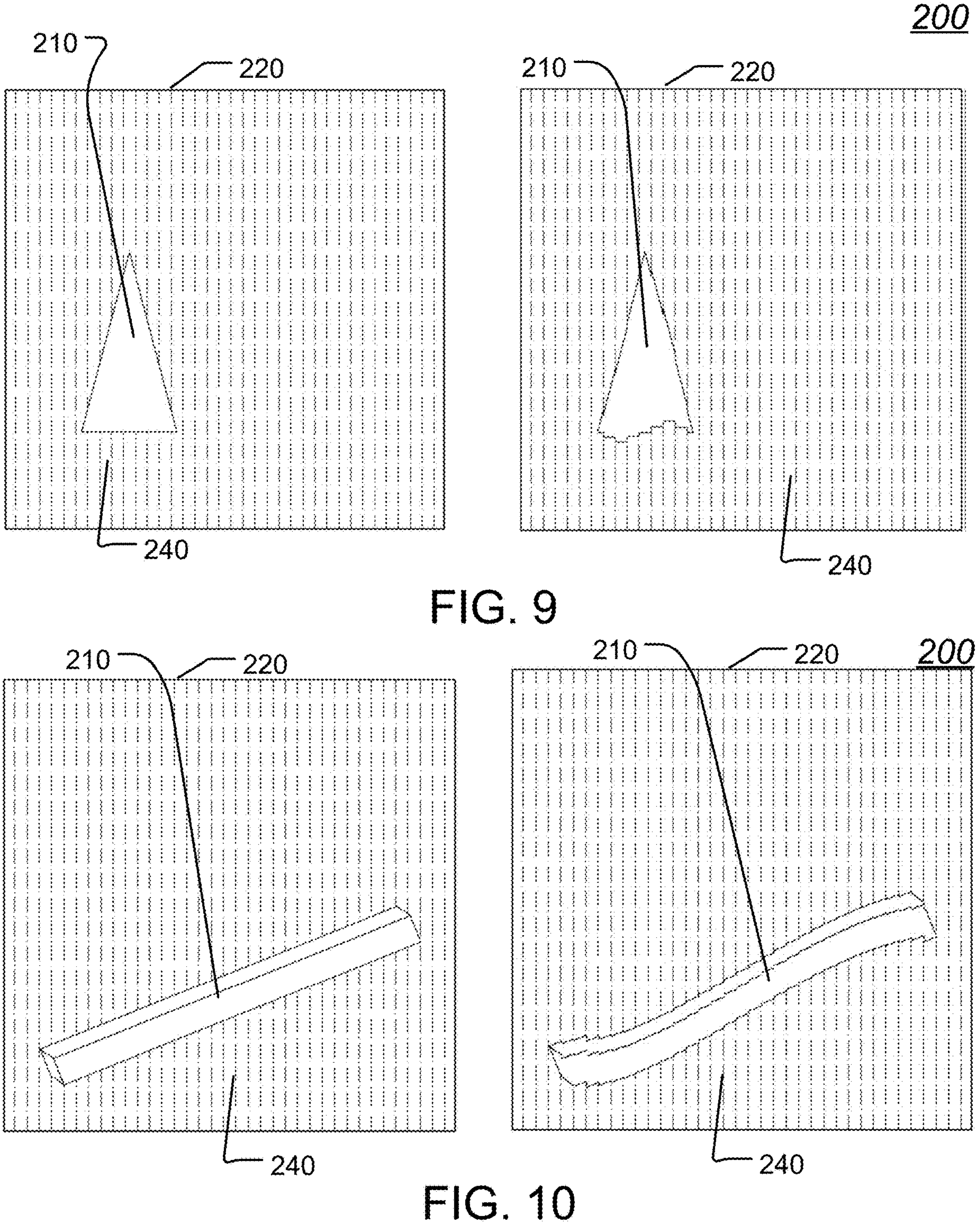
Figures 11, 12:
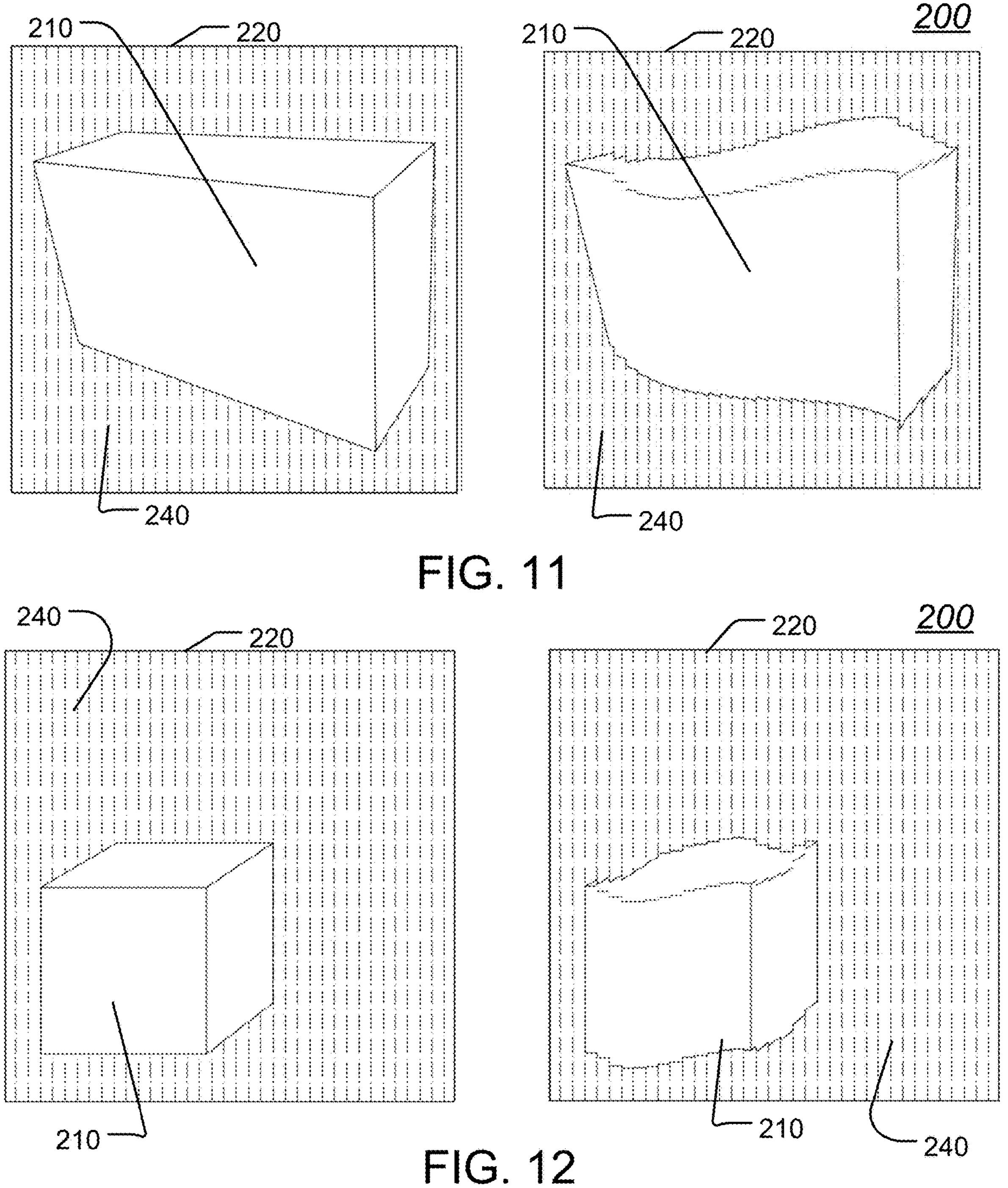

In FIGS. 5 and 6, for example, the article 210 can be perceived as waving as the columns 240 of pixels are shifted up or down with respect to each other from the image of the article 210 shown in the left image frame 220 to the form shown in the right image frame 220, and then shifting back to its initial static image form (left image frame 220). The repeating sequence (e.g., wave up—wave down—wave up) can be repeated for a predetermined amount of time, which can be defined in the image rendering commands or by the user of the EUC device 40.

Although the examples shown in FIGS. 3A-12 are described as including a static image of an article 210 that is sliced into a plurality of pixel rows 230 or a plurality of pixel columns 240, it is noted that static image content, including the article 210, can be sliced in either pixel rows 230 or pixel columns 240 or both pixel rows and columns, such as, for example, in a pixel grid (not shown) or array (not shown) comprising rows and columns of pixels.

Figure 13:
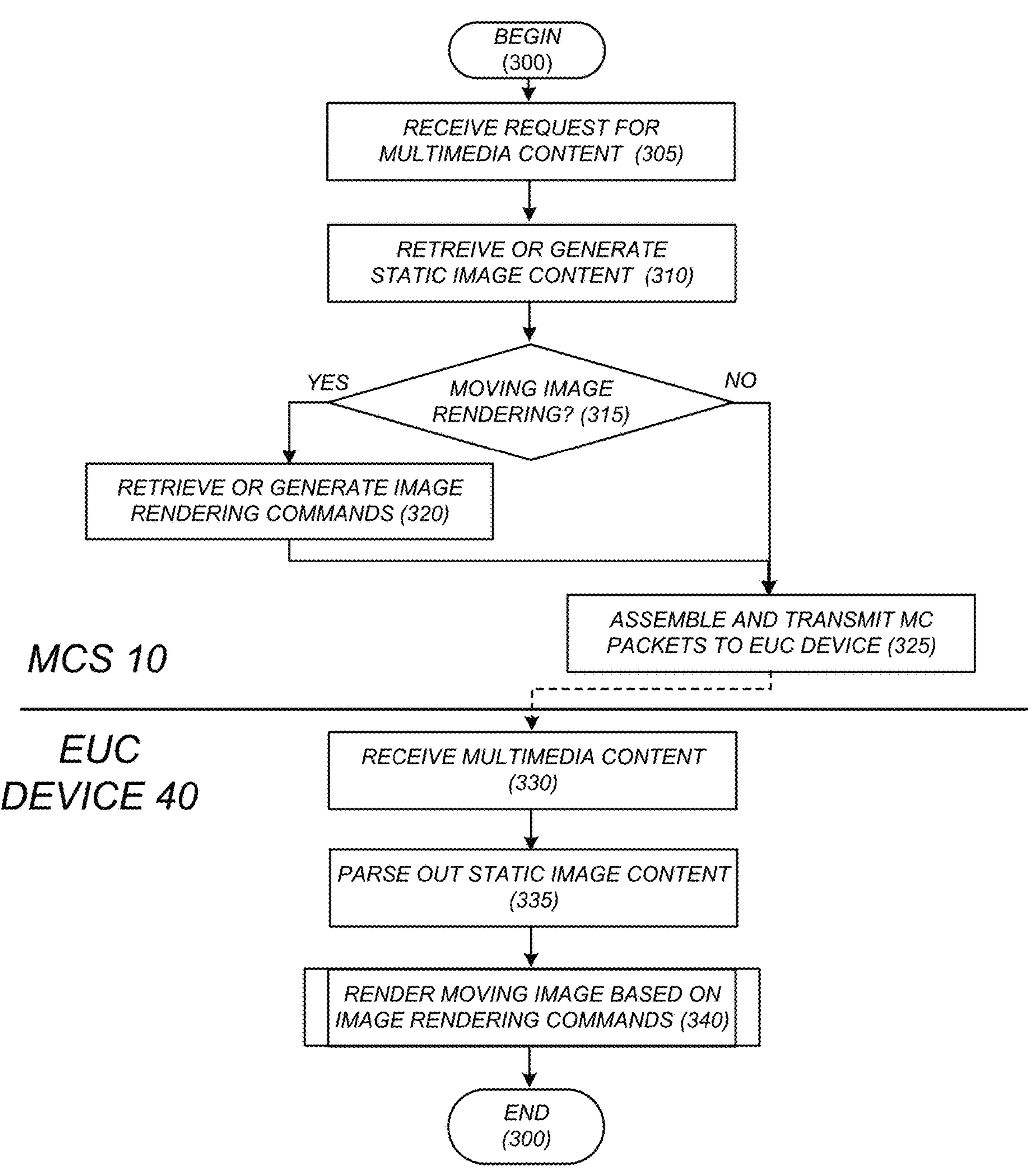
FIG. 13 depicts an example of an image rendering process, according to the principles of the disclosure.

FIG. 13 shows an example of an image rendering process 300, according to the principles of the disclosure. The process 300 can be carried out by the MC system 10 or CPC device 30 (shown in FIGS. 1 and 2). A portion of the process 30 can be carried by the EUC device 40 (shown in FIG. 1).

Referring to FIGS. 1 and 13 concurrently, the MC system 10 can receive a request for multimedia content from the EUC device 40 or CPC device 30 (Step 305). The request can be received as a request, for example, for access to a Uniform Resource Locator (URL) or website address, for access to the multimedia content, a search query, or an instruction to transmit multimedia content to the EUC device 40. The MC system 10 can, for example, based on the multimedia content or the request for multimedia content, retrieve from the database 170 (shown in FIG. 2) or an external storage (not shown) associated static image content, or the MC system 10 can generate the static image content (Step 310). According to a non-limiting embodiment, the static image content can be included or embedded in the multimedia content, in which case the static image content can be identified and tagged in Step 310.

A determination can be made whether a still image in the static image content is to be rendered as an animation or moving image (Step 315). If it is determined that the still image is to be rendered as an animation or moving image (YES at Step 315), then the image rendering commands can be retrieved or generated (Step 320) and the multimedia content, including static image content and image rendering commands, can be packaged (for example, by the multimedia content packager 190, shown in FIG. 2) and transmitted as multimedia content packages to the EUC device 40 (Step 325). The image rendering commands can be retrieved from, for example, the database 170 (shown in FIG. 2), the CPC device 30, or local storage 120 (shown in FIG. 2). Alternatively, image rendering commands can be generated by, for example, the image render command generator 180 (shown in FIG. 2).

If it is determined that the still image is not rendered as an animation or moving image (NO at Step 315) and, instead, reproduced as a still image, then the multimedia content can be packaged and transmitted to the EUC device 40 (Step 325) without image rendering commands.

The multimedia content data packages can be received at the EUC device 40 (Step 330) and the static image content and image rendering commands parsed from the multimedia data packages (Step 335). The static image content can be processed based on the image rendering commands and an animation or moving image generated according to the image rendering commands (Step 340). The static image rendering commands can include, for example, JavaScript that, when executed by a Canvas 2D API, cause the EUC device 40 to effectuate caching of a still image, slicing of the still image pixel data into a plurality of rows and/or columns, modifying each slice (or subset) of pixels, and rendering of a frame for the moving image on a frame-by-frame basis from the still image pixel data to display an animation or moving image, which can be rendered on the fly. The image rendering commands can include instructions that define the shape, size, location, and modification of the image, including, for example, shifting or movement of slices of pixels with respect to other on a frame-by-frame basis to generate the perception of a moving image over time.

Figure 14:
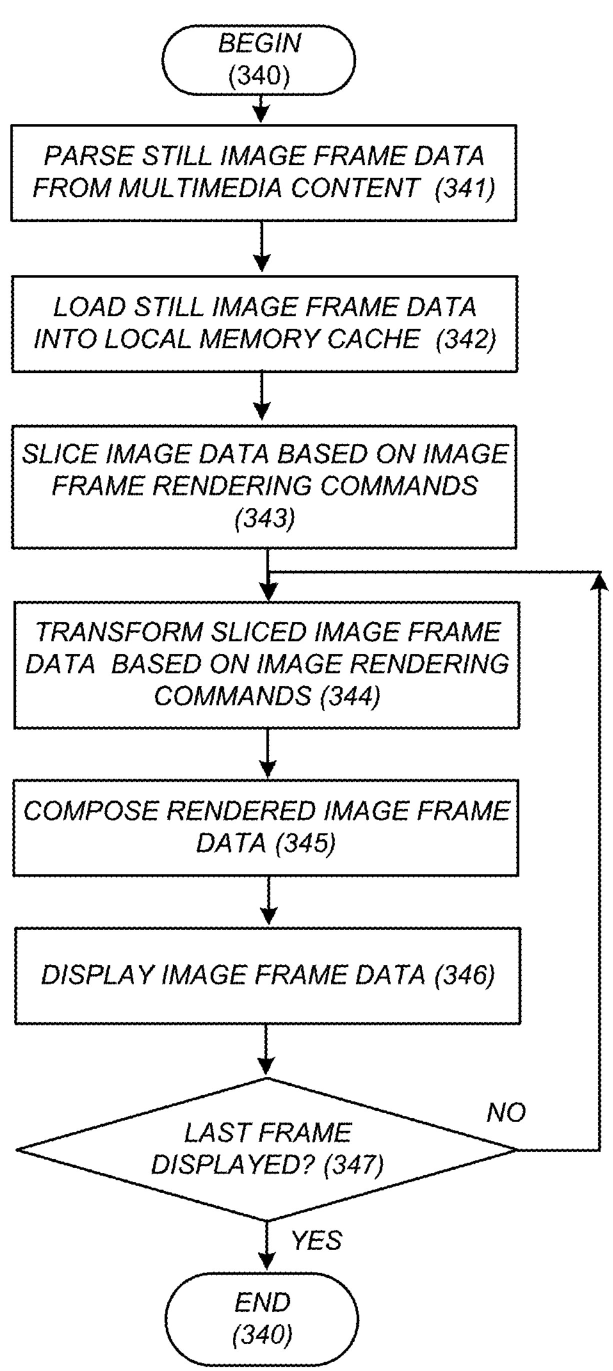
FIG. 14 shows an example of an animation or moving image rendering process that can be carried out at a step in the rendering process shown in FIG. 13.

FIG. 14 shows an example of an animation or moving image rendering process that can be carried out at Step 340. The animation or moving image rendering process can be carried out by the EUC device 40 (shown in FIG. 1), for example, by means of a runtime environment such as a web browser that includes a scripting engine such as, for example, JavaScript API.

Referring to FIG. 14, still image frame data can be parsed from the multimedia content packages received from the MC system 10 (Step 341) and loaded into a local memory cache (not shown) in the EUC device 40 (Step 342). The still image frame data can be parsed from the static image content in the multimedia content packages.

After the still image frame is loaded into the local memory cache, the image pixel data can be divided (or "sliced") into x horizontal rows ("slices") (for example, shown in FIGS. 3A and 3B) and/or y vertical columns ("slices") (for example, shown in FIG. 4) (Step 343), where x is a positive integer greater than 1 and y is a positive integer greater than 1; x can be equal to or different from y. Depending on the image rendering commands, which can include for example, a breathing effect (shown in FIGS. 3A and 3B), a psychedelic effect (shown in FIG. 4), a wave effect (shown in FIGS. 5-12), or any other visually perceptible animation of the image pixel data, each slice in the image frame can be modified (Step 344) and rendered by the EUC device 40 (Step 345) according to, for example, JavaScript instructions included in the image rendering commands. Each rendered frame for the moving image can be displayed on a frame-by-frame basis on the display screen of the EUC device 40 (Step 346).

A determination can be made whether the displayed frame is the last frame to be displayed in the animation or moving image rendering based on the image rendering commands (Step 347). The determination can be made based on, for example, a parameter included with the received commands. Alternatively, the animation or moving image can repeat ad infinitum, in which case Step 346 can be omitted. If it is determined that the displayed frame (Step 346) is the last frame to be displayed (YES at Step 347), the process can end, otherwise (NO at Step 347) the sliced image frame data can be modified (Step 344), rendered (Step 345) and displayed as a frame for the moving image (Step 346) on a frame-by-frame basis to generate an animation or moving image rendering of the still image received in the static image content (Step 330, shown in FIG. 13).

Various implementations of the systems and techniques described here can be realized in digital electronic circuitry, integrated circuitry, specially designed ASICs (application specific integrated circuits), computer hardware, firmware, software, or combinations thereof. These various implementations can include implementation in one or more computing resources that are executable or interpretable on a programmable system including at least one programmable computing resource, which can be special or general purpose, coupled to receive data and instructions from, and to transmit data and instructions to, a storage system, at least one input device, and at least one output device.

To provide for interaction with a user, the systems and techniques described here can be implemented on a computing device having a display device such as, for example, a CRT (cathode ray tube), LCD (liquid crystal display) or LED (light emitting diode) monitor for displaying information to the user and a keyboard and a pointing device, such as a mouse or a trackball, by which the user can provide input to the computing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

The computing system can include clients and servers. A client and server are generally remote from each other and typically interact through a communication network. The relationship of client and server arises by virtue of computer programs running on the respective computers and having a client-server relationship to each other.

The terms "a," "an," and "the," as used in this disclosure, means "one or more," unless expressly specified otherwise.

The term "backbone," as used in this disclosure, means a transmission medium or infrastructure that interconnects one or more computing devices or communicating devices to provide a path that conveys data packets and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, GSM voice calls, SMS, EMS, MMS messaging, CDMA, TDMA, PDC, WCDMA, CDMA2000, GPRS, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a smart phone, a mobile phone, a tablet, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, or servers. A computer or computing device can include hardware, firmware, or software that can transmit or receive data packets, instruction signals or data signals over a communication link. The computer or computing device can be portable or stationary.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers. The computer-readable medium can include magnetic discs, optical disks, memory, or Programmable Logic Devices (PLDs).

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, or firmware. A computing resource can include machine instructions for a programmable computing device, and can be implemented in a high-level procedural or object-oriented programming language, or in assembly/machine language.

The term "content artifact," as used in this disclosure, means any mark, symbol, image, or sound, or any combination thereof that identifies a person, an entity (e.g., a company, a manufacturer, a service provider, a distributor, a supplier), an article, a product, a service, or the like, including, but not limited to, for example, a logo, a brand, an emblem, a sign, a trademark, a trade dress, an image, a stamp, or a badge.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "information resource," as used in this disclosure means, but is not limited to, computer code or computer executable instructions that cause content to be displayed on a display device, or to invoke a function to display the content such as on a website or web page that includes primary content or a search results landing page provided by a search engine.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for enabling an end user computing device to render a moving image on a display device, the system comprising:

- an image render command generator arranged to provide one or more image rendering commands that are executable at the end user computing device to render the moving image on a frame-by-frame basis from a still image in multimedia content;
- a multimedia content packager arranged to assemble a multimedia content package comprising the multimedia content;
- a processor arranged to:
  - receive a content request from the end user computing device;
  - obtain static image content that is responsive to the content request, said static image content comprising the still image;
  - determine whether the still image is to be rendered as the moving image in response to the content request;
  - when it is determined that the still image is to be rendered as the moving image in response to the content request, cause the multimedia content packager to assemble the multimedia content package to comprise the still image and the one or more image rendering commands;
  - when it is determined that the still image is not to be rendered as the moving image in response to the content request, cause the multimedia content packager to assemble the multimedia content package to comprise the still image without image rendering commands; and
  - transmit the multimedia content package to the end user computing device in response to the content request,
  - wherein the one or more image rendering commands are arranged to, when executed, cause the end user computing device to render the moving image on the frame-by-frame basis, and
  - wherein the still image is rendered at the end user computing device when the multimedia content package comprises the still image without image rendering commands.

2. The system according to claim 1, wherein the one or more image rendering commands are arranged to, when executed, cause the end user computing device to slice the still image into a plurality of rows or columns of pixels.

3. The system according to claim 2, wherein the plurality of rows or columns of pixels comprise a plurality of rows of pixel data.

4. The system according to claim 2, wherein the plurality of rows or columns of pixels comprise a plurality of columns of pixel data.

5. The according to claim 2, wherein the one or more image rendering commands are arranged to, when executed, cause the end user computing device to modify at least a subset of the plurality of rows or columns of pixels to shift, move, compress, or expand with respect to one another.

6. The system according to claim 2, wherein the one or more image rendering commands are arranged to, when executed, cause the end user computing device to generate a frame for the moving image based on the modified at least subset of the plurality of rows or columns of pixels.

7. The system according to claim 2, wherein the one or more image rendering commands are arranged to, when executed, cause the end user computing device to render and display a sequence of frames for the moving image on the end user computing device based on the modified at least subset of the plurality of rows or columns of pixels.

8. The system according to claim 1, wherein the one or more image rendering commands are arranged to, when executed, cause the end user computing device to load the still image into a memory cache in the end user computing device.

9. The system according to claim 8, wherein the one or more image rendering commands are arranged to, when executed, cause the end user computing device to render the moving image on the frame-by-frame basis by modifying the still image in the memory cache.

10. The system according to claim 1, wherein the one or more image rendering commands are arranged to, when executed, cause the end user computing device to render and display a plurality of frames for the moving image on the frame-by-frame basis of an article.

11. The system according to claim 1, wherein the one or more image rendering commands include JavaScript that, when executed by a JavaScript engine, renders a sequence of frames for the moving image from the still image.

12. A method to transmit multimedia content having a still image to an end user computing device to render the still image as a moving image on a display device, the method comprising:

receiving, at a computing device via a communication link, a content request from the end user computing device;

obtaining, at the computing device, static image content that is responsive to the content request, said static image content comprising the still image;

determining whether the still image is to be rendered as the moving image in response to the content request;

when it is determined that the still image is to be rendered as the moving image in response to the content request, causing, at the computing device, an assembly of a multimedia content package to comprise the still image and one or more image rendering commands that are executable by the end user computing device to render the moving image on a frame-by-frame basis;

when it is determined that the still image is not to be rendered as the moving image in response to the content request, causing, at the computing device, the assembly of the multimedia content package to comprise the still image without image rendering commands; and transmitting, at the computing device via a same or different communication link, the multimedia content package to the end user computing device in response to the content request, wherein the one or more image rendering commands are arranged to, when executed, cause the end user computing device to render the moving image on the frame-by-frame basis, and wherein the still image is rendered at the end user computing device when the multimedia content package comprises the still image without image rendering commands.

13. The method according to claim 12, wherein the one or more image rendering commands are arranged to, when executed, cause the end user computing device to slice the still image into a plurality of rows or columns of pixels.

14. The method according to claim 13, wherein the one or more image rendering commands are arranged to, when executed, cause the end user computing device to modify at least a subset of the plurality of rows or columns of pixels to shift, move, compress, or expand with respect to one another.

15. The method according to claim 13, wherein the one or more image rendering commands are arranged to, when executed, cause the end user computing device to generate a frame for the moving image based on the modified at least subset of the plurality of rows or columns of pixels.

16. The method according to claim 13, wherein the one or more image rendering commands are arranged to, when executed, cause the end user computing device to render and display a sequence of frames for the moving image on the end user computing device based on the modified at least subset of the plurality of rows or columns of pixels.

17. The method according to claim 12, wherein the one or more image rendering commands are arranged to, when executed, cause the end user computing device to load the still image into a memory cache in the end user computing device.

18. The method of claim 17, wherein the one or more image rendering commands are arranged to, when executed, cause the end user computing device to render the moving image on the frame-by-frame basis by modifying the still image in the memory cache.

19. The method according to claim 12, wherein the one or more image rendering commands are arranged to, when executed, cause the end user computing device to render and display a plurality of frames for the moving image on the frame-by-frame basis of an article.

20. The method according to claim 12, wherein the one or more image rendering commands include JavaScript that, when executed by a JavaScript engine, renders a sequence of frames for the moving image from the still image.

* * * * *